Patented Mar. 8, 1927.

1,619,938

UNITED STATES PATENT OFFICE.

ALFRED E. JURY, OF RUTHERFORD, NEW JERSEY, AND OMAR H. SMITH, OF NEW YORK, N. Y., ASSIGNORS TO GENERAL RUBBER COMPANY, OF NEW YORK, N. Y., A CORPORATION OF NEW JERSEY.

METHOD OF PRESERVING LATEX AND PRODUCT.

No Drawing. Substitute for application Serial No. 16,045, filed March 16, 1925. This application filed June 8, 1926. Serial No. 114,560.

This invention relates to a method of preserving latex and to the product.

Latex when obtained from the tree tends to coagulate in a relatively short time, and even where it is to be promptly converted into crude rubber on the plantation it is necessary to add a preservative to prevent natural coagulation before the treatment to convert it into crude rubber. Where the latex is to be preserved for a longer period, as for instance when it is to be shipped long distances it is necessary to add larger amounts of the preservative. A large number of preservative substances are known which vary in efficiency, cost, and in the qualities imparted to the latex, the one most commonly used being ammonia. Formaldehyde has been used to some extent, and the rubber from such treated latex when spray dried has excellent milling properties, but when formaldehyde is used alone for this purpose it renders the cost excessive and it is not efficient for preserving the latex for extended periods of time, as when shipped to other countries, since the latex under such conditions tends to thicken.

An object of our invention is to provide a cheap and efficient method of preserving latex for desired periods of time without appreciable change in its consistency.

Another object is to provide a method of preserving latex which will give a rubber having good milling properties when spray dried.

Still another object is to provide a cheap stable latex of uniform consistency over varying periods of time.

Other objects will appear from the detailed disclosure in the specification.

The invention consists broadly in adding to latex an antiseptic or bactericide in quantities sufficient to prevent bacterial action but insufficient to prevent thickening, and in addition supplying a basic material in quantity such that the hydrogen ion concentration will not become great enough to cause thickening of the latex.

We have found that latex coagulates rapidly when the hydrogen ion concentration becomes too high, the limit of such concentration being approximately $1 \times 10^{-4}$. By hydrogen ion concentration is meant the number of gram atoms of hydrogen ions per liter of solution. Latex also coagulates more slowly by reason of bacterial action at lower hydrogen ion concentrations unless a bactericidal agent such as formaldehyde is added or the hydrogen ion concentration is reduced to a point where the bacteria are rendered inactive. The latter limit is approximately $1 \times 10^{-12}$ and is the maximum hydrogen ion concentration which is desirable for basic preservatives. Even if bacterial action is prevented by the addition of a suitable agent, the latex thickens undesirably if the hydrogen ion concentration approaches $1 \times 10^{-5}$ but it does not thicken when the hydrogen ion concentration is less than $1 \times 10^{-7}$. As an example, formaldehyde latex has a hydrogen ion concentration of about $1 \times 10^{-5}$, and this is believed to account for its tendency to thicken on standing for a long period of time. According to our invention the hydrogen ion concentration of the latex is reduced to a point below $1 \times 10^{-7}$ by the addition of a sufficient amount of a basic material, and at the same time enough formaldehyde, for example, is added to prevent bacterial action. By this procedure the quantity required of the expensive formaldehyde is reduced to a minimum while the latex is efficiently preserved for extended periods of time without thickening, and the milling qualities of rubber from such latex when spray dried are excellent. While formaldehyde is preferred as the antiseptic or bactericide other substances can be used such as phenol, cresol, resorcinol, and hexyl resorcinol. While various bases can be used they must be of such a character that they will not act upon the formaldehyde to reduce its preservative properties. A suitable base should also have a hydrogen ion concentration not less than $1 \times 10^{-13}$ when dissolved in water in a proportion of .5%, and as a preferred substance we have used trisodium phosphate. The trisodium phosphate is a relatively cheap base and when the latex is converted into rubber by spray drying the base remains in the rubber and has a decided accelerating value in the cure.

The quantities required of the antiseptic and base will vary according to the length of time it is desired to preserve the latex and on account of other conditions. For instance in the case of latex which had been collected during rainy weather and is diluted with rain water it shows a greater tendency to coagulate, the reason for which is not exactly clear but which may be due to tannin washed into it from the trees, and in such case a relatively greater amount of the antiseptic and base are required. As one example of the process, where the latex is to be promptly converted into crude rubber, it may be preserved for short periods of time with relatively small quantities of the antiseptic and base, for instance approximately .1% formaldehyde and .0042% of trisodium phosphate. In some instances it may be desired to keep the latex for a longer period before converting it into crude rubber or otherwise employing it, and for an interval of about two weeks the proportions used may be approximately .2% formaldehyde and .2% trisodium phosphate. If latex is to be kept for long periods, as for instance in shipping to other countries, the quantities must be correspondingly increased, and in such case approximately .5% formaldehyde and 1.5% trisodium phosphate may be used. The above examples are merely illustrative, and the proportions used will of course be varied to suit conditions. One of the disadvantages of the use of formaldehyde as a preservative is that the commercial formaldehyde generally contains free formic acid, and the grade ordinarily used has been found to contain sufficient free acid to render a 10% formaldehyde solution .01% normal acid. This free acid, of course, tends to cause coagulation or thickening, but by the use of our process this tendency is corrected, as the free formic acid is neutralized. Instead of trisodium phosphate other suitable bases such as tripotassium phosphate or other phosphates may be used. If antiseptics other than formaldehyde are used, enough of the base must be added to reduce the hydrogen ion concentration of the latex below $1\times10^{-7}$ and it is not sufficient to merely neutralize the phenol with a base before adding it to latex. As an example latex may be treated with .3 to .5% of phenol and 1 to 1.5% of hydrated trisodium phosphate. In general the proportions of base to be used with formaldehyde, as above specified, are sufficient for use with the other antiseptics named.

It will be seen that by our invention a method of preserving latex has been provided which is relatively cheap, in fact being cheaper than preservation by the use of ammonia. The crude rubber obtained from latex preserved by the invention is possessed of desirable qualities, particularly in regard to the milling properties of such rubber when obtained by spray drying, but the invention is not limited in its application to the treatment of latex which is to be spray dried and it may also be applied to latex which is to be coagulated, washed, and dried by the usual processes, or which is to be employed in other ways. The use of phosphates as the base is desirable in that with their use there is simply an increase in the phosphate content naturally occurring in the latex, and the invention therefore does not involve the addition of inorganic salts which do not naturally occur in the latex and which may be undesirable for some purposes.

While specific applications of the invention have been given, it is susceptible of modification, and it is therefore not desired to limit the scope of the appended claims otherwise than as the prior art may require.

Subject matter of this case has been previously described and claimed in our co-pending application Serial No. 16,045, filed Mar. 16, 1925.

Having thus described our invention what we claim and desire to protect by Letters Patent is:—

1. The method of preserving latex which comprises treating the latex with an organic antiseptic and an alkaline phosphate.

2. The method of preserving latex which comprises treating the latex with an organic antiseptic and trisodium phosphate.

3. The method of preserving latex which comprises treating it with formaldehyde and an alkaline phosphate.

4. The method of preserving latex which comprises treating it with formaldehyde and trisodium phosphate.

5. The method of preserving latex which comprises treating it with a sufficient quantity of an organic antiseptic to prevent bacterial action and also adding an alkaline phosphate, whose hydrogen ion concentration is greater than $1\times10^{-13}$ when dissolved in water in a proportion of .5%, in quantity sufficient to reduce the hydrogen ion concentration below $1\times10^{-7}$.

6. The method of preserving latex which comprises treating it with a sufficient quantity of formaldehyde to prevent bacterial action and also adding an alkaline phosphate, whose hydrogen ion concentration is greater than $1\times10^{-13}$ when dissolved in water in a proportion of .5%, in quantity sufficient to reduce the hydrogen ion concentration below $1\times10^{-7}$.

7. The method of preserving latex which comprises treating it with an organic antiseptic not substantially in excess of .5%, and also adding an alkaline phosphate not substantially in excess of 1.5%.

8. As a new article latex preserved with an organic antiseptic and an alkaline phosphate.

9. As a new article, latex preserved with formaldehyde and an alkaline phosphate.

10. As a new article, latex preserved with an organic antiseptic and trisodium phosphate.

11. As a new article, latex preserved with formaldehyde and trisodium phosphate.

12. As a new article, latex preserved with an organic antiseptic and an alkaline phosphate whose hydrogen ion concentration is greater than $1 \times 10^{-13}$ when dissolved in water in a proportion of .5%.

13. As a new article, latex preserved with an organic antiseptic and a sufficient quantity of an alkaline phosphate to reduce its hydrogen ion concentration below $1 \times 10^{-7}$.

14. As a new article, latex preserved with an organic antiseptic and a sufficient quantity of trisodium phosphate to reduce its hydrogen ion concentration below $1 \times 10^{-7}$.

15. As a new article, latex preserved with formaldehyde in a quantity sufficient to prevent bacterial action and trisodium phosphate not substantially in excess of 1.5%.

Signed at New York, county of New York, and State of New York, this 7th day of June, 1926.

ALFRED E. JURY.

Signed at New York, county of New York, and State of New York, this 7th day of June, 1926.

OMAR H. SMITH.